US009481366B1

(12) United States Patent
Gordon et al.

(10) Patent No.: US 9,481,366 B1
(45) Date of Patent: Nov. 1, 2016

(54) AUTOMATED CONTROL OF INTERACTIONS BETWEEN SELF-DRIVING VEHICLES AND ANIMALS

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/830,103

(22) Filed: Aug. 19, 2015

(51) Int. Cl.
*B60W 30/09* (2012.01)
*G05D 1/00* (2006.01)

(52) U.S. Cl.
CPC ............ *B60W 30/09* (2013.01); *G05D 1/0088* (2013.01)

(58) Field of Classification Search
CPC ..................... B60W 30/09; G05D 1/0088
See application file for complete search history.

(56) References Cited

U.S. PATENT DOCUMENTS

| 5,975,791 A | 11/1999 | McCulloch |
| 6,064,970 A | 5/2000 | McMillan et al. |
| 6,326,903 B1 | 12/2001 | Gross et al. |
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 7,124,088 B2 | 10/2006 | Bauer et al. |
| 7,877,269 B2 | 1/2011 | Bauer et al. |
| 7,894,951 B2 | 2/2011 | Norris et al. |
| 8,031,062 B2 | 10/2011 | Smith |

(Continued)

FOREIGN PATENT DOCUMENTS

| CN | 1135063 | 11/1996 |
| CN | 202012052 | 10/2011 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Yuen Wong
(74) *Attorney, Agent, or Firm* — Law Office of Jim Boice

(57) ABSTRACT

A computer-implemented method, system, and/or computer program product causes a self-driving vehicle (SDV) to avoid a physical encounter with an animal. An SDV on-board computer on an SDV receives an animal predicted movement signal from an animal signal transceiver worn by an animal, and an SDV movement signal from a set of SDV sensors on the SDV that track movement of the SDV. One or more processors determine a probability of a physical encounter (E) between the SDV and the animal exceeding a predefined confidence value (C) based on the animal predicted movement signal and the SDV movement signal. In response to determining that E>C, the SDV on-board computer instructs an SDV control processor on the SDV to direct SDV vehicular physical control mechanisms on the SDV to adjust the current speed and direction of movement of the SDV.

17 Claims, 7 Drawing Sheets

(56) References Cited

U.S. PATENT DOCUMENTS

| | | |
|---|---|---|
| 8,078,349 B1 | 12/2011 | Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,190,322 B2 | 5/2012 | Lin et al. |
| 8,489,434 B1 | 7/2013 | Otis et al. |
| 8,509,982 B2 | 8/2013 | Montemerlo et al. |
| 8,660,734 B2 | 2/2014 | Zhu et al. |
| 8,676,466 B2 | 3/2014 | Mudalige |
| 8,793,046 B2 | 7/2014 | Lombrozo et al. |
| 8,874,305 B2 | 10/2014 | Dolgov et al. |
| 8,903,591 B1 | 12/2014 | Ferguson et al. |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,020,697 B2 | 4/2015 | Ricci et al. |
| 9,024,787 B2 | 5/2015 | Alshinnawi et al. |
| 9,082,239 B2 | 7/2015 | Ricci |
| 9,305,411 B2 | 4/2016 | Ricci |
| 2004/0199306 A1 | 10/2004 | Heilmann et al. |
| 2005/0104745 A1 | 5/2005 | Bachelder et al. |
| 2006/0106671 A1 | 5/2006 | Biet |
| 2006/0200379 A1 | 9/2006 | Biet |
| 2007/0100687 A1 | 5/2007 | Yoshikawa |
| 2008/0048850 A1 | 2/2008 | Yamada |
| 2009/0248231 A1 | 10/2009 | Kamiya |
| 2010/0179720 A1 | 7/2010 | Lin et al. |
| 2012/0277947 A1 | 11/2012 | Boehringer et al. |
| 2013/0030657 A1 | 1/2013 | Chatterjee et al. |
| 2013/0261871 A1 | 10/2013 | Hobbs et al. |
| 2014/0095214 A1 | 4/2014 | Mathe et al. |
| 2014/0129073 A1 | 5/2014 | Ferguson |
| 2014/0136045 A1* | 5/2014 | Zhu ................... G05D 1/0214 701/23 |
| 2014/0188999 A1 | 7/2014 | Leonard et al. |
| 2014/0195213 A1 | 7/2014 | Kozloski et al. |
| 2014/0214255 A1 | 7/2014 | Dolgov et al. |
| 2014/0222277 A1 | 8/2014 | Tsimhoni et al. |
| 2014/0297116 A1 | 10/2014 | Anderson et al. |
| 2014/0310186 A1 | 10/2014 | Ricci |
| 2014/0324268 A1 | 10/2014 | Montemerlo et al. |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0035685 A1 | 2/2015 | Strickland et al. |
| 2015/0051778 A1 | 2/2015 | Mueller |
| 2015/0066284 A1 | 3/2015 | Yopp |
| 2015/0095190 A1 | 4/2015 | Hammad et al. |
| 2015/0134178 A1 | 5/2015 | Minoiu-Enache |

FOREIGN PATENT DOCUMENTS

| | | |
|---|---|---|
| CN | 102650882 | 8/2012 |
| CN | 202772924 | 3/2013 |
| WO | 2014058263 A1 | 4/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |

OTHER PUBLICATIONS

M. Fox, "Self-driving cars safer than those driven by humans: Bob Lutz", CNBC, www.cnbc.com, Sep. 8, 2014, 1 page.
X. Jardin, "Terrifying dashcam video captures distracted teen drivers crashing while goofing off", Boing Boing, www.boingboing.net, Mar. 26, 2015, 1 page.
U.S. Appl. No. 14/887,388, filed Oct. 20, 2015.
A. Abkowitz, "Do Self-Driving Cars Spell Doom for Auto Insurers?", Bloomberg L.P., Sep. 10, 2014, pp. 1-2.
Anonymous, "Self-Driving Cars and Insurance", Insurance Information Institute, Inc., Feb. 2015, pp. 1-3.
Gomes, Lee. "Google's Self-Driving Cars Still Face Many Obstacles / MIT Technology Review.", MIT Technology Review. Aug. 28, 2014. Web. <http://www.technologyreview.co./news/530276/hidden-obstabscles-for-googles-self-driving-cars/>.
Smith, Mark. "Inovations: Emerging Trends in the Wheelchair Market." New Mobility Magazine, Aug. 1, 2014. web. <http://www.newmobility.com/2014/08/emerging-trends/>.
Crothers, Brooke. "Google Now Reporting Self-Driving Car Accidents: Her, It's Not the Car's Fault". forbes.com, Jun. 8, 2015. <http:/www.forbes.com/sites/brookecrothers/2015/06/08/google-now-reportibg-driverless-car-accidents/>.
Anonymous, 'System and Method to Target Advertisements for the Right Focus Group' ip.com, No. 000218285, May 31, 2012, pp. 1-2.
Anonymous, "Car Built-In Mechanism to Enforce Mandatory Self-Driving Mode", ip.com, No. 00234916, Feb. 14 2014, pp. 1-3.
T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.
J. Miller, "Self-Driving Car Technologu's Benefits, Potential Risks, and Solutions", The Energy Collective, theenergycollective.com, Aug. 19, 2014, pp. 1-7.
J. O'Callaghan, "Inside the Mercedes Self-Guidubg Car That's Built for Luxurious Living in, Not Driving", Associated Newspapers Ltd., Daily Mail, dailymail.com.uk, Jan. 6, 2015, pp. 1-13.
J. Wei et al., "Towards a Viable Autonomous Driving Research Platform", IEEE, Intelegent Vehicles Symposium (IV), 2013, pp. 1-8.
J. Farrier, "Airlines Infuse Their Planes With Smells to Calm You Down", Neatorama, neatorama.com, Mar. 29, 2015, 1 Page.
T. Vanderbilt, "Let the Robot Drive: The Autonomous Car of the Future Is Here", Wired Magazine, Conde Nast, www.wired.com, Jan. 20, 2012, pp. 1-34.
Chen S, et al., A Crash Risk Assessment Model for Roas Curves. Inproceedings 20th International Technical Conference on the Enhanced Saftey of Vehicles., 2007. Lyon, France.
E. Lehrer, "The Insurance Implications of Google's Self-Driving Car", Insurance Journal, Right Street Bloh=G, May 28, 2014, pp. 1-2.
Anonymous, "Diagnostics Mechanism for Self-Driving Cars to Validate Self-Driving Capabilities", ip.com, Jun. 6, 2014, pp. 1-5. ip.com.
U.S. Appl. No. 14/855,731 Non-Final Office Action Mailed Apr. 15, 2016.

\* cited by examiner

US 9,481,366 B1

AUTOMATED CONTROL OF INTERACTIONS BETWEEN SELF-DRIVING VEHICLES AND ANIMALS

BACKGROUND

The present disclosure relates to the field of vehicles, and specifically to the field of self-driving vehicles (SDVs). Still more specifically, the present disclosure relates to the field of controlling self-driving vehicles when proximate to an animal.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

A computer-implemented method, system, and/or computer program product causes a self-driving vehicle (SDV) to avoid a physical encounter with an animal. An SDV on-board computer on an SDV receives an animal predicted movement signal from an animal signal transceiver worn by an animal. The animal predicted movement signal is indicative of a predicted movement of the animal towards a position that the SDV is approaching on a roadway. The SDV on-board computer receives an SDV movement signal from a set of SDV sensors on the SDV that track movement of the SDV. The SDV movement signal describes a current speed and direction of movement of the SDV on the roadway. One or more processors determine a probability of a physical encounter (E) between the SDV and the animal exceeding a predefined confidence value (C) based on the animal predicted movement signal and the SDV movement signal. In response to determining, by the SDV on-board computer and based on the SDV movement signal and the animal predicted movement signal, that E>C, the SDV on-board computer instructs an SDV control processor on the SDV to direct SDV vehicular physical control mechanisms on the SDV to adjust the current speed and direction of movement of the SDV, thereby preventing (or at least reducing the likelihood of) the SDV from striking the animal at the position that the SDV is approaching on the roadway.

DETAILED DESCRIPTION

Figure 1:
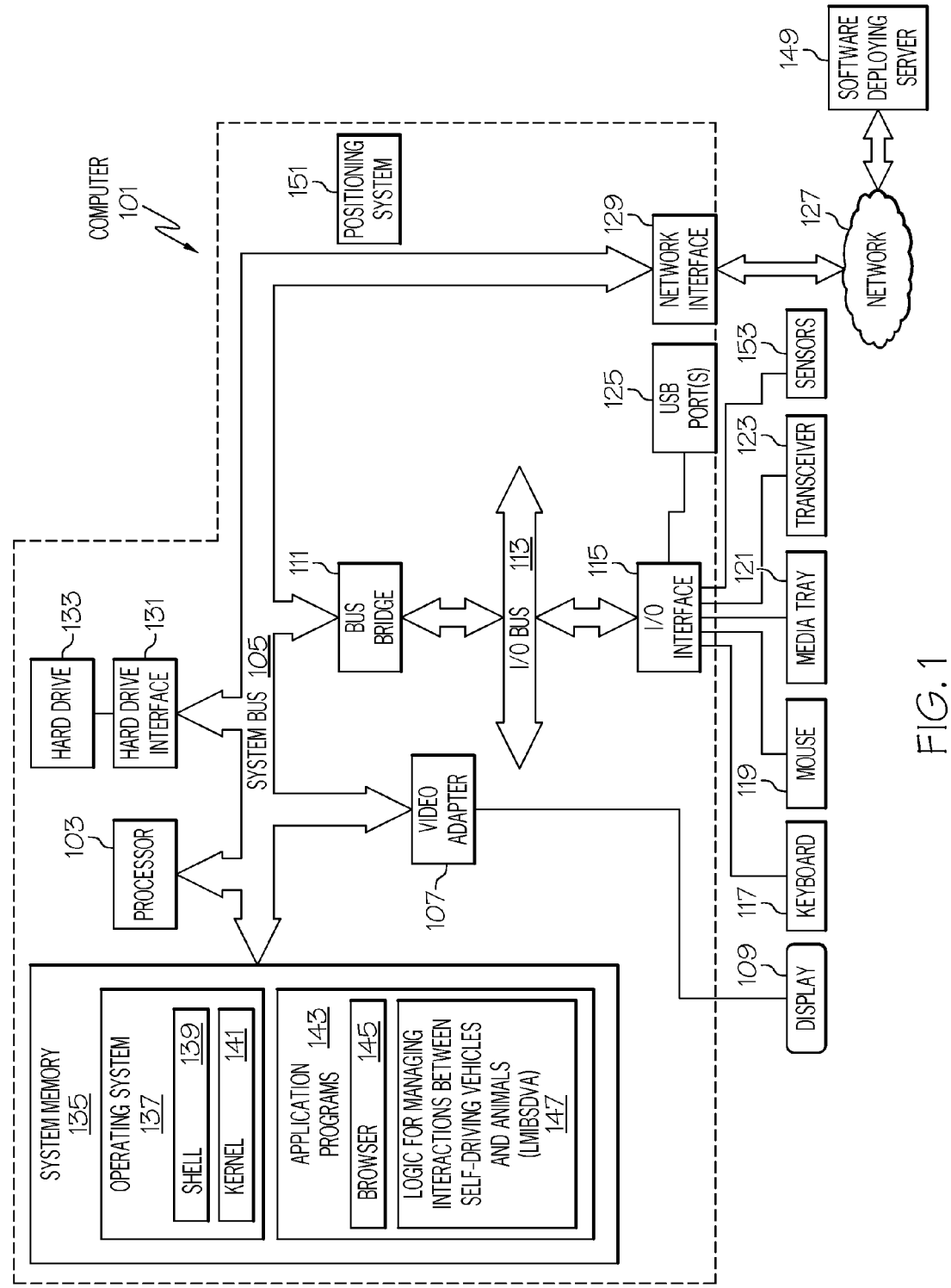
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, roadway monitoring computer 201 shown in FIG. 2, animal computer 301 shown in FIG. 3, SDV on-board computer 401 shown in FIG. 4, and/or a coordinating server 501 depicted in FIG. 5.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., establishing communication among roadway monitoring computer 201, animal computer 301, SDV on-board computer 401, and/or coordinating server 501 depicted in the figures below) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Interactions Between Self-Driving Vehicles and Animals (LMIBSDVA) 147. LMIBSDVA 147 includes code for implementing the processes described below, including those described in FIGS. 2-6. In one embodiment, computer 101 is able to download LMIBSDVA 147 from software deploying server 149, including in an on-demand basis, wherein the code in LMIBSDVA 147 is not downloaded until needed for execution. In one embodiment of the present invention, software deploying server 149 performs all of the functions associated with the present invention (including execution of LMIBSDVA 147), thus freeing computer 101 from having to use its own internal computing resources to execute LMIBSDVA 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, moisture detectors, etc. that detect ambient weather conditions.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As described herein and in one or more embodiments of the present invention directed to avoiding a collision between an SDV traveling on a roadway and a non-human animal (e.g., a dog), a smart collar is fitted to the animal for communication with the SDV. The smart collar detects that animal's location, the animal's proximity to the SDV, and the state of the animal (e.g., states such as sitting, walking, running, chasing an object, displaying agitation or calmness, etc.). Based on such data (location, state, etc.), the smart collar sends a prediction of an encounter/interaction/collision/strike between the SDV and the animal, and then directs the SDV to avoid coming so near the animal, such that an encounter/interaction/collision/strike with the animal is less likely.

Thus, in a high-level overview of one or more embodiments of the present invention, a smart collar worn by the animal detects the location of the animal and its current proximity to the SDV. Logic within the smart collar computes, based on the state of the animal (e.g., movement, level of agitation, attachment to a leash, proximity to an owner, etc.) and the state of the SDV (e.g., speed, direction of movement, autonomous/manual mode, etc.), the likelihood of an encounter (E). If this likelihood of such an encounter (E) reaches/exceeds a level of confidence (C) (i.e., E≥C), then an instruction to the SDV requesting mitigating action (to avoid the encounter) is requested/transmitted from transmission logic within the smart collar. The SDV receives the request for a mitigating action and automatically adjusts its course, speed, etc., in order to avoid hitting the animal.

Figure 2:
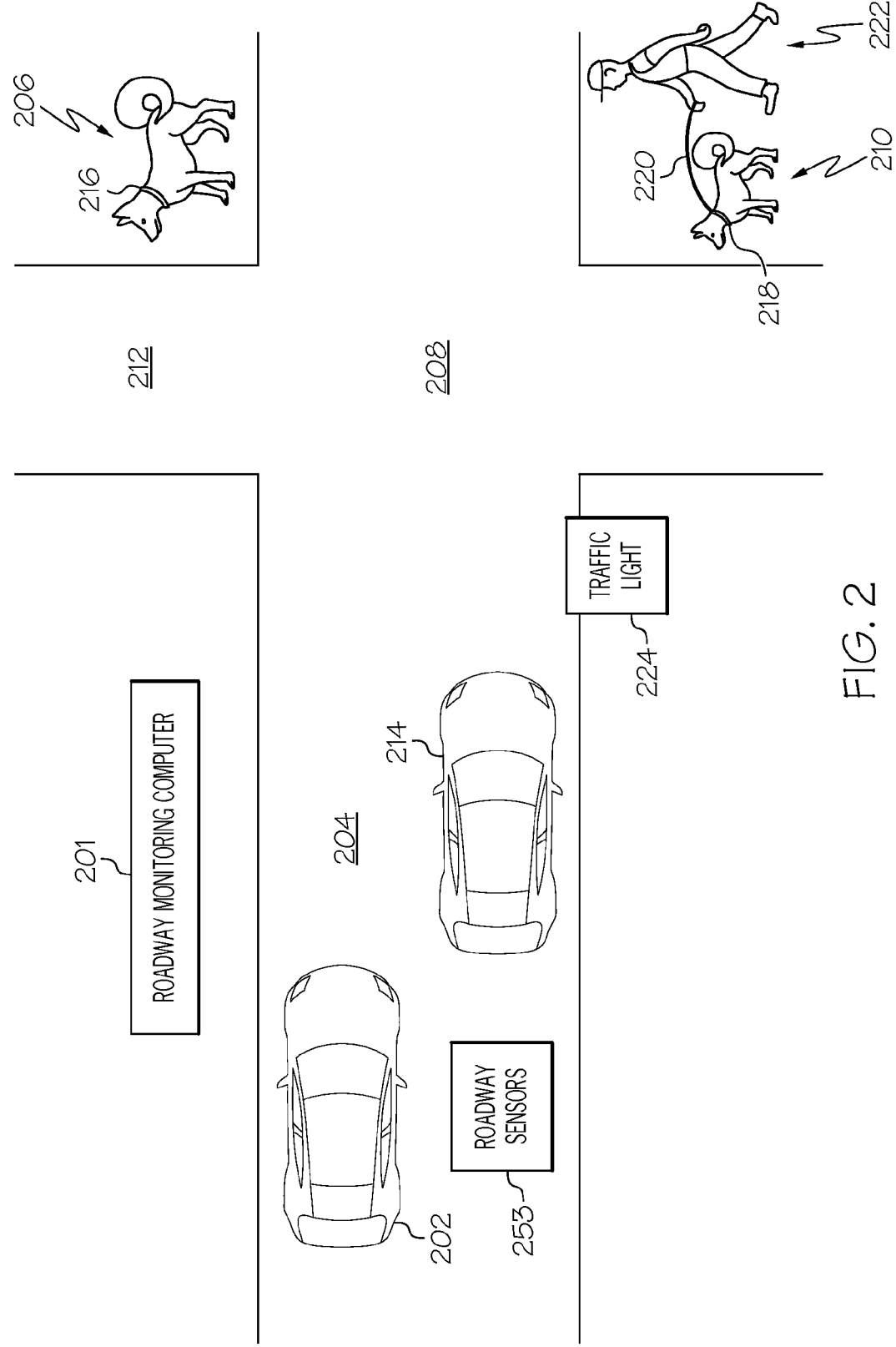
FIG. 2 illustrates an exemplary self-driving vehicle (SDV) approaching a position on a roadway into which an animal may be moving.

With reference now to FIG. 2, an exemplary self-driving vehicle (SDV) 202 is depicted traveling along a roadway 204 in accordance with one or more embodiments of the present invention. As shown, SDV 202 is approaching an animal 206, who is near a position 208 on the roadway 204, and which is being approached by SDV 202. Position 208 is depicted in FIG. 2 as an intersection, but may be any place on, or in some embodiments, next to roadway 204.

In one embodiment of the present invention, animal 206 is any domesticated animal capable of terrestrial locomotion. For example, animal 206 may be a house pet (e.g., a dog, a cat, etc.) or a farm animal (e.g., a cow, a goat, etc.). In another embodiment of the present invention, animal 206 is a human being. Thus, unless otherwise indicated, the "animal" described in the present claims includes both domesticated animals as well as human beings (i.e., human pedestrians).

A roadway monitoring computer 201 (analogous to computer 101 shown in FIG. 1) monitors roadway sensors 253 (analogous to sensors 153 shown in FIG. 1), computing devices attached to the animal 206, and/or computing devices in the SDV 202.

Examples of roadway sensors 253 include, but are not limited to, moisture sensors, traffic sensors, temperature sensors, light sensors, noise sensors, and traffic light sensors, which are used to detect road conditions on roadway 204.

A moisture sensor may utilize any type of technology for detecting the amount of moisture on the surface of roadway 204. For example, a Frequency Domain Reflectometry (FDR) sensor embedded within roadway 204 can be used to measure a frequency of an oscillating circuit in the FDR, which changes as the amount of moisture on roadway 204 changes. In another embodiment, an ohmmeter embedded on the surface of roadway 204 measures the amount of resistance between two electrical nodes, which changes as the amount of moisture on roadway 204 changes.

A traffic sensor may use any type of sensor that measures the quantity and speed of vehicles traveling on roadway 204. Examples of such traffic sensors include laser sensors that detect passing vehicles on roadway 204 as they break a laser pathway between a laser source and a laser sensor; mechanical pressure hoses mounted on the surface of roadway 204 that provide a change in pressure as cars drive over the hoses; inductive loops embedded within the roadway 204 that generate a field that changes when a metallic vehicle passes over the inductive loop; etc.

A temperature sensor may be a remote sensor that measures infrared emissions from the surface of the roadway 204; a thermocouple embedded within the surface of roadway 204 that measures the surface temperature of roadway 204 based on the change in resistance to the thermocouple caused by changes in roadway surface temperature; etc.

A light sensor may be any type of sensor that detects light levels, including but not limited to, photoresistors whose resistances change based on the amount of ambient light around particular positions on roadway 204.

A noise sensor (i.e., microphone) is any type of acoustic-to-electric sensor that converts sound (audible or non-audible) into an electrical signal, using electromagnetic induction, capacitance change, piezoelectricity induction, etc. imposed on the noise sensor elements by the sound. Thus, if the noise sensor detects a high level of traffic noise (as pre-identified according to a noise pattern indicative of many cars on the roadway 204), then a high level of traffic is inferred. Similarly, if the noise sensor detects a certain frequency/amplitude/volume of noise that has been predetermined to be indicative of a defective road condition (e.g., icy road conditions, potholes, loose pavement, etc.), then this road condition for roadway 204 is understood to exist by the SDV on-board computer 401 depicted in FIG. 4.

A traffic light sensor may use a light sensor or an electromagnetic signal sensor. That is, a light sensor associated with the SDV on-board computer 401 may "see" a particular color (red, yellow, green) of an upcoming traffic light 224 on the roadway 204, thus inferring that the SDV 202 will need to adjust its operation accordingly. Alternatively, an electromagnetic signal sensor may receive an electromagnetic control signal being broadcast by the traffic light. For example, whenever the traffic light switches from red to green, an electronic signal is also broadcast, notifying any computing device (e.g., SDV on-based computer 401) with an electromagnetic signal receiver of 1) the fact that the traffic light is switching from red to green and/or 2) the location of the traffic light.

In one embodiment of the present invention, sensor readings from roadway sensors 253 shown in FIG. 2 are weighted and summed by a roadway monitoring computer 201 to further adjust the autonomous control of SDV 202. Thus, one or more processors within roadway monitoring computer 201 receive sensor readings from multiple sensors (roadway sensors 253), where each of the multiple sensors detects a different type of current condition of the roadway. The processor(s) weight each of the sensor readings for different current conditions of the roadway, and then sum the weighted sensor readings for the different current conditions of the roadway. The processor(s) determine whether the summed weighted sensor readings exceed a predefined level. In response to determining that the summed weighted sensor readings do exceed a predefined level, then autonomous control of SDV 202 continues in a same manner (e.g., "normal" mode in dry roadway conditions). However, if a first sensor (from roadway sensors 253) detects ice on the roadway 204 and the second sensor (from roadway sensors 253) detects darkness, then the SDV 202 may be shifted to "caution" mode, due to historical data that shows that many more accidents are caused by "black ice" (ice that is not visible to the eye of the driver in dark conditions). Assume further that the first sensor reading (detecting ice on the roadway 204) is weighted at one level (e.g., is multiplied by 5) and the second sensor reading (detecting darkness on the roadway 204) is weighted at another level (e.g., is multiplied by 3). These weighted sensor readings are then added up. If the summed sensor reading weighted values exceed some predetermined value (which has been predetermined based on historic or engineering analyses as being a breakpoint over which the chance of accidents greatly increase), then control of the SDV goes to the more conservative "caution" mode (e.g., gives the SDV more cushion room, greater time to brake, etc.). However, if the summed sensor reading weighted values fall below this predetermined value, then control stays in the "normal" mode (e.g., gives the SDV the default amount of cushion room, time to brake, etc.).

In one embodiment of the present invention, a weighted voting system is used to weight the various variables used in making the decisions regarding whether to place the SDV in the "normal" or "caution" modes described above. Such inputs may include: a history of accidents on a roadway 204 for SDVs in "normal autonomous mode" compared to SDVs on the roadway 204 in "caution autonomous mode", a level of fuel usage/efficiency of SDVs in "normal autonomous mode" compared to SDVs on the roadway 204 in "caution autonomous mode", etc. Such weighted voting approaches may be characterized primarily by three aspects—the inputs (e.g., accident rates, fuel usage), the weights (e.g., weighting accident rates higher than fuel usage levels), and the quota (e.g., how many weighted inputs must be received in order to determine which control mode to use). The inputs are (I1, I2, . . . , IN), where "N" denotes the total number of inputs. An input's weight (w) is the number of "votes" associated with the input to determine how significant (weighted) the input is. A quota (q) is the minimum number of votes required to "pass a motion", which in this case refers to a decision made to place the SDV 204 in the "normal autonomous mode" or the more careful "caution autonomous mode".

As shown in FIG. 2, animal 206 is wearing a smart collar 216. Thus, with reference now to FIG. 3, an exemplary smart collar 216 that is worn by animal 206 is depicted. One component of smart collar 216 is an animal computer 301 (analogous in architecture to computer 101 shown in FIG. 1). Animal computer 301 is coupled to a transceiver 323 (analogous to transceiver 123 shown in FIG. 1), allowing the animal computer 301 to communicate with SDV 202 (or more specifically, to the SDV on-board computer 401 depicted in FIG. 4).

Animal computer 301 may be any type of mobile computing device, such as a microprocessor, when incorporated into smart collar 216. In embodiments in which animal 206 is a human being, animal computer 301 may be a smart phone, a tablet computer, a wearable computer, intelligent headgear, shoes, helmets, smart clothes, etc. that include processing logic. Furthermore, when the animal 206 is a human being, animal computer 301 may be integrated into a wheelchair, a cane, hearing aid interfaces, audio players, bicycles, and/or any other device that is being used by the human being.

Figure 3:
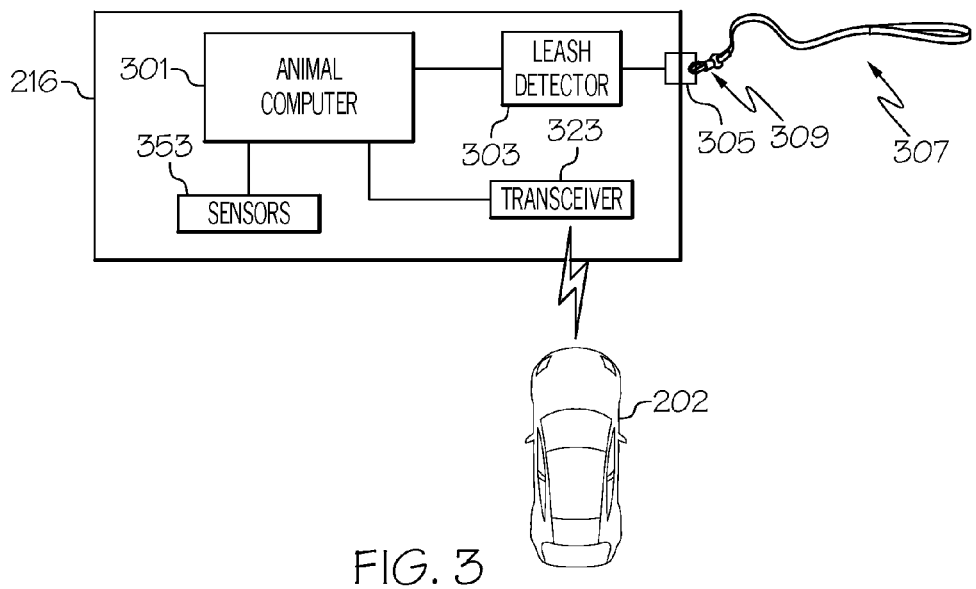
FIG. 3 depicts components of a smart collar being worn by an animal depicted in FIG. 2.

As depicted in FIG. 3, sensors 353 (analogous to sensors 153 shown in FIG. 1) are coupled to animal computer 301. Examples of sensors 353 include, but are not limited to, light sensors, microphones, vibration sensors, etc. that are able to detect the presence and movement of SDV 202, as well as ambient conditions (weather, darkness, wind, etc.) of the roadway 204 shown in FIG. 2.

Also part of smart collar 216 is a ring 305, which provides an attachment point to the smart collar 216 for a leash 307. A leash detector 303 is able to detect (1) that the leash 307 is attached to the ring 305, and/or (2) the amount of tension being exerted against the ring 305 by the leash 307.

In one embodiment of the present invention, ring 305 includes a contact switch (not shown) that is closed/opened when the leash clip 309 on the leash 307 is clipped to the ring 305. That is, the leash clip 309, when clipped to ring 305, closes a circuit within the ring 305, which is detected by the leash detector 303. Other embodiments for detecting that the clip 309 on the leash 307 is connected to the ring 305 utilize a strain gauge, transducers, field detectors, etc., which are able to detect the metallic nature and presence of the clip 309.

In one embodiment of the present invention, the leash detector 303 is able to detect the amount of tension being exerted on the ring 305 by the leash 307 (i.e., by the leash clip 309). That is, a strain gauge (e.g., part of leash detector 303) affixed to the ring 305 detects how much tension is being exerted by the leash 307 against the ring 305. Thus, if the animal 206 is pulling against its smart collar 216, the strain gauge will detect the tension being applied to the leash 307 by the animal 306. If there is little or no tension against the ring 305, then either the owner has dropped the leash 307 (as indicated by a small amount (i.e., less than a predetermined amount of tension) of tension being exerted against the ring 305) or there is no leash attached to the smart collar 216 (as indicated by no tension being exerted against the ring 305).

For example, as shown in FIG. 2, smart collar 216 worn by animal 206 has no leash attached thereto. Thus, there is no tension being exerted against the ring 305 on smart collar 216. However, smart collar 218 being worn by animal 210 is attached to a leash 220 being held by a handler 222. The leash detector 303 will recognize that leash 220 is attached to smart collar 218, and/or will recognize how much tension is being exerted on the leash 220.

Figure 4:
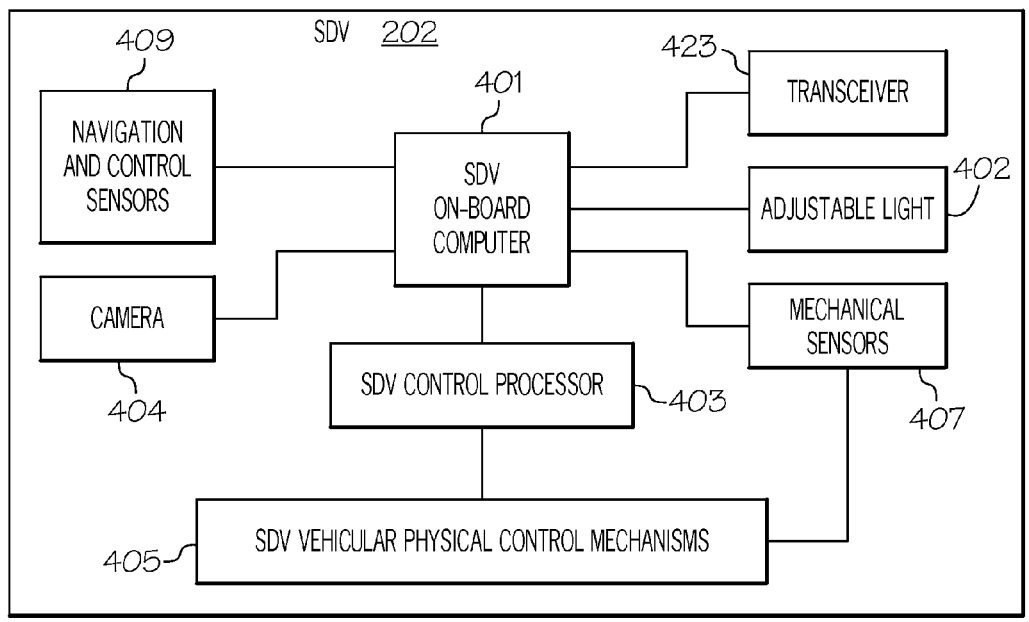
FIG. 4 depicts additional detail of control hardware within the SDV depicted in FIG. 2.

With reference now to FIG. 4, additional detail of hardware components within SDV 202 are depicted.

An SDV on-board computer 401 uses outputs from navigation and control sensors 409 to control the SDV 202. Navigation and control sensors 409 include hardware sensors that (1) determine the location of the SDV 202; (2) sense other cars and/or obstacles and/or physical structures around SDV 202; (3) measure the speed and direction of the SDV 202; and (4) provide any other inputs needed to safely control the movement of the SDV 202.

With respect to the feature of (1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of (2) sensing other cars and/or obstacles and/or physical structures around SDV 202, the positioning system 151 may use radar or other electromagnetic energy that is emitted from an electromagnetic radiation transmitter (e.g., transceiver 423 shown in FIG. 4), bounced off a physical structure (e.g., another car), and then received by an electromagnetic radiation receiver (e.g., transceiver 423). By measuring the time it takes to receive back the emitted electromagnetic radiation, and/or evaluate a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of (3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of (4) providing any other inputs needed to safely control the movement of the SDV 202, such inputs include, but are not limited to, control signals to activate a horn, turning indicators, flashing emergency lights, etc. on the SDV 202.

The SDV 202 is able to operate in an autonomous mode, in which the SDV vehicular physical control mechanisms 405 (e.g., the engine throttle, steering mechanisms, braking systems, turn signals, etc.) are controlled by the SDV control processor 403, which is under the control of the SDV on-board computer 401. Thus, by processing inputs taken from navigation and control sensors 409, the SDV 202 can be controlled autonomously.

Furthermore, the SDV on-board controller 401 is able to communicate with other systems, such as the animal computer 301 shown in FIG. 3, via a transceiver 423 (analogous to transceiver 123 shown in FIG. 1).

In one or more embodiments of the present invention, the SDV on-board computer 401 is coupled to a camera 404, which is able to capture (preferably in digital format) still and moving video images, including but not limited to images of animal 206.

Also within the exemplary SDV 202 shown in FIG. 4 are mechanical sensors 407, which generate electronic signals describing the state of mechanical equipment within SDV 202, including but not limited to the SDV vehicular physical control mechanisms 405. Thus, mechanical sensors 407 are able to detect the thickness of brake pads, pressure in a brake line, tire inflation levels, any loose linkage in a steering assembly, etc., any of which affect the safety and/or performance of SDV 202.

Figure 5:
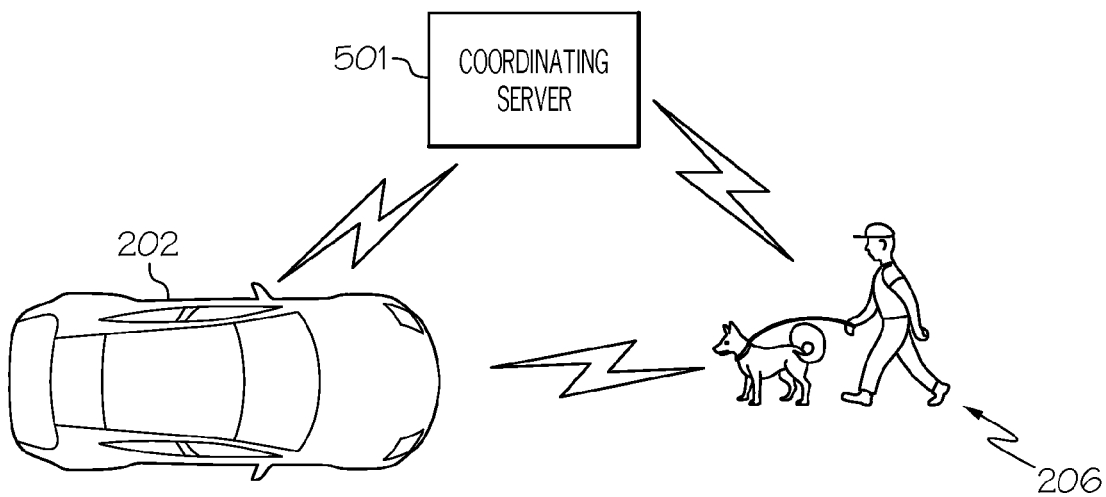
FIG. 5 depicts communication linkages among hardware in the SDV depicted in FIG. 2, hardware worn by the animal depicted in FIG. 2, and a coordinating server in accordance with one or more embodiments of the present invention.

Using their respective transceivers, the coordinating server 501 shown in FIG. 5 (analogous to computer 101 shown in FIG. 1 and/or roadway monitoring computer 201 shown in FIG. 2) is able to communicate with, and thus control computing devices within SDV 202 (e.g., SDV on-board computer 401 shown in FIG. 4), as well as being able to communicate with computing devices with animal 206 (e.g., animal computer 301 shown in FIG. 3).

Figure 6:
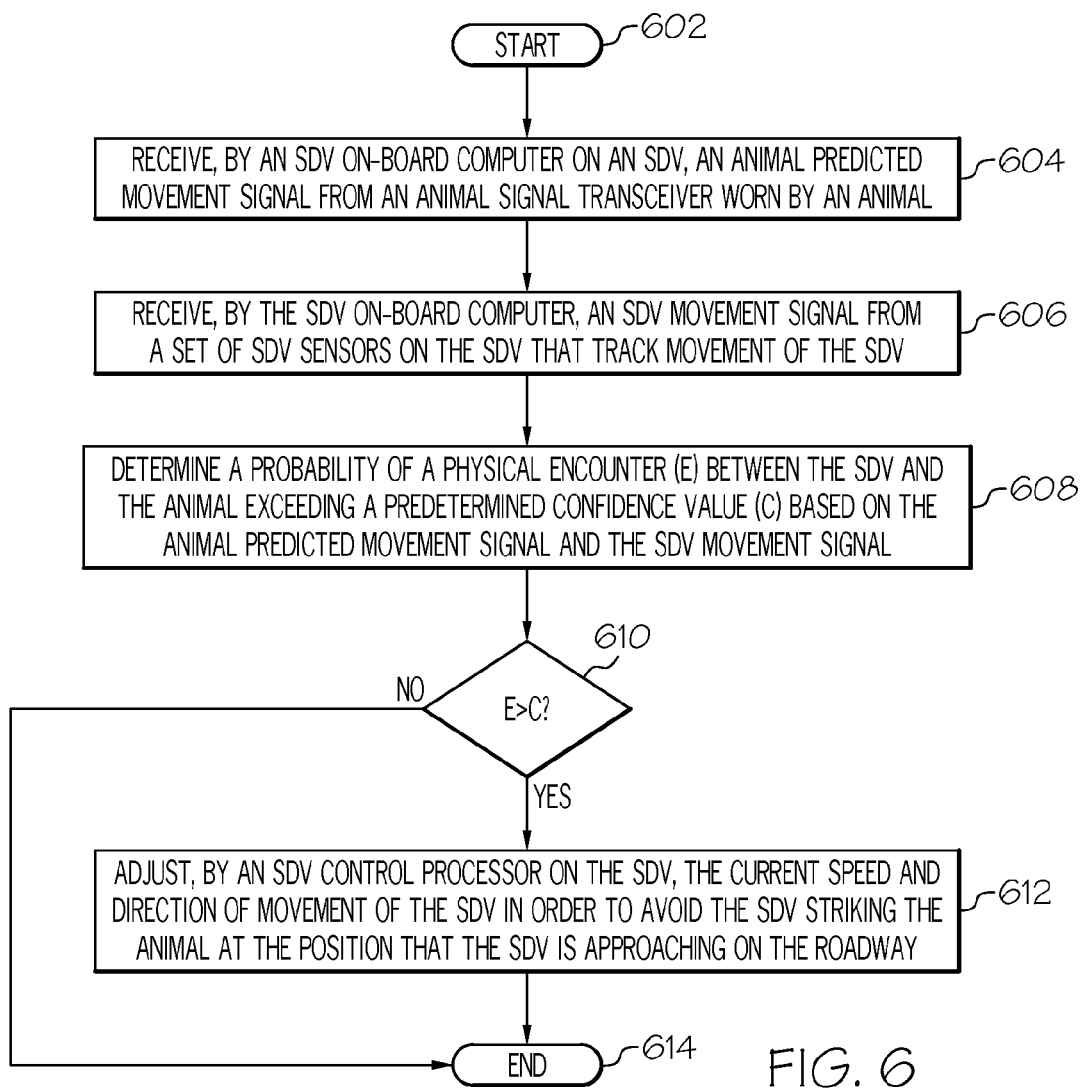
FIG. 6 is a high-level flow chart of one or more steps performed by one or more processors and/or other hardware devices to control a physical interaction between a self-driving vehicle (SDV) and an animal.

With reference now to FIG. 6, a high-level flow chart of one or more operations performed by a processor and/or other hardware devices for controlling a physical interaction between a self-driving vehicle (SDV) and an animal is presented.

After initiator block 602, an SDV on-board computer (e.g., SDV on-board computer 401 shown in FIG. 4) on an SDV (e.g., SDV 202 introduced in FIG. 2) receives a primary animal predicted movement signal from a first animal signal transceiver (e.g., transceiver 323 shown in FIG. 3) worn by a first animal (e.g., animal 206 shown in FIG. 2) (block 604). The primary animal predicted movement signal is indicative of (i.e., is a predictor signal for) a predicted movement of the first animal towards a position that the SDV is approaching on a roadway (e.g., position 208 shown in FIG. 2).

In one or more embodiments of the present invention, an animal profile of animal 206 provides an indication of animal 206's behavior and/or the predicted movement of animal 206.

For example, the animal profile may be based on biometric sensor readings taken from sensors 353 (e.g., biometric sensors) in the smart collar 216 being worn by animal 206. These biometric sensors may include electromyography (EMG) sensors that measure the movement of skeletal muscles of the animal 206. These EMG sensors thus provide a description of both gross muscle movement (e.g., the animal is "moving") to fine muscle movement (e.g., the animal is using muscles on his left side to move to the left at a certain velocity/acceleration). The animal computer 301 interprets these biometric sensor readings to provide the indication of animal 206's behavior and/or the predicted movement of animal 206.

Furthermore, the animal profile may be based on accelerometer sensor readings taken from sensors 353 (e.g., accelerometers that use piezoelectric, piezoresistive and/or capacitive components to convert the physical movement of the animal 206 into an electrical signal (which is interpreted by animal computer 301)). These accelerometer sensor readings are analyzed by animal computer 301 to predict the imminent movement (e.g., into the roadway on which the SDV is traveling) of the animal 206.

In one embodiment of the present invention, the animal profile used to predict the movement of animal 206 is history-based. Such history-based information may be stored in a memory (e.g., system memory 135 shown in FIG. 1) within the animal computer 301 shown in FIG. 3, the roadway monitoring computer 201 shown in FIG. 2, and/or the coordinating server 501 shown in FIG. 5.

For example, the animal profile for animal 206 may include information that describes the age of animal 206. Based on this age information, generalized predictions can be made (particularly when incorporated into the breed of animal 206) regarding the behavior/movement of animal 206. For example, a young pup may be more likely to run into roadway 204 than an older dog.

In another embodiment of the present invention, the animal profile for animal 206 describes how fast and how far the animal can run before the SDV 202 reaches the animal's location (e.g., location 208 in FIG. 2). For example, by knowing how fast and how far animal 206 is physically capable of going (by generalized breed information about animal 206 and/or by specific historical data taken while animal 206 has run in the past), animal computer 301 is able to calculate whether or not animal 206 will be physically able to reach position 208 on roadway 204 at the same time as SDV 202.

In another embodiment of the present invention, the animal profile for animal 206 describes how energetic animal 206 currently is. This determination may be made by biometric sensors (e.g., EMG sensors, blood pressure sensors, respiration rate sensors, etc.) within smart collar 216, or they may be history-based. That is, in one embodiment, real-time readings from biometric sensors determine how energetic animal 206 is, and thus how likely he/she is to run onto roadway 204, at what speed, etc. Alternatively, a record of recent biometric readings may be stored within animal computer 301. Thus, if these recent biometric readings indicate that animal 206 has been running at a difficult level for the past ten minutes, then animal 206 is less likely to dash into roadway 204, simply due to fatigue.

In another embodiment of the present invention, the amount of tension being exerted on a leash (e.g., leash 220 depicted in FIG. 2) will indicate how energetic animal 210 is. If a strain gauge within leash detector 303 in FIG. 3 indicates that animal is tugging strongly (e.g., beyond a predefined degree of force) against leash 220, this indicates a highly energetic animal 210. However, if there is little or no force being exerted against leash 220, this indicates a calm animal 210. That is, if animal 210 is wearing a smart collar 218 (which is architecturally equivalent to smart collar 216 depicted in FIG. 3), then the amount of tension being detected (e.g., by leash detector 303) between smart collar 218 and leash 220 will indicate a level of control over animal 210 (i.e., describing whether or not handler 222 has control over animal 210) and/or an excitement level of animal 210 (e.g., calm, excited, agitated, etc.).

In another embodiment of the present invention, the animal profile for animal 206 is based on a record of animal 206 running into traffic on roadway 204 and/or other roadways. That is, by using GPS or other positioning signals along with velocity/acceleration signals from sensors, a record can be stored within animal computer 301 of how frequently animal 206 has run into roadways. This information is then used to predict whether or not animal 206 will run in front of SDV 202 on roadway 204.

In another embodiment of the present invention, the animal profile for animal 206 is based on whether there are other animals nearby that might be chased by animal 206. For example, assume that animal 206 is at a first corner of the intersection of roadway 204 and roadway 212 shown in FIG. 2, while animal 210 is at a second corner of this intersection. If smart collar 216 on animal 206 detects the presence and/or location and/or movement of animal 210 based on signals from smart collar 218 (which has a similar or same architecture as that depicted for smart collar 216 in FIG. 3) on animal 210, a prediction can be made that animal 206 will run towards animal 210 or vice versa.

Returning now to FIG. 6, the SDV on-board computer also receives an SDV movement signal from a set of SDV sensors (e.g., navigation and control sensors 409 shown in FIG. 4) on the SDV that track movement of the SDV, as described in block 606. Generated by using GPS signals, accelerometer readings, speedometer readings, chronographic readings, etc. taken for/from SDV 202, the SDV movement signal describes a current speed and direction of movement of the SDV 202 on the roadway 204.

As described in block 608, one or more processors (e.g., within SDV on-board computer 401, roadway monitoring computer 201, coordinating server 501) determine a probability of a physical encounter (E) between the SDV and the first animal exceeding a predefined confidence value (C) based on the primary animal predicted movement signal and the SDV movement signal. That is, "E" is a value that describes how likely it is that SDV 202 will strike animal 206 on roadway 204.

As indicated in query block 610, a determination is made by the SDV on-board computer and based on the SDV movement signal and the primary animal predicted movement signal, that the probability of the physical encounter (E) between the SDV and the first animal exceeds the predefined confidence value (C) (that is, E>C, or alternatively E≥C). If so, then an SDV control processor (e.g., SDV control processor 403 shown in FIG. 4) on the SDV directs SDV vehicular physical control mechanisms (e.g., SDV vehicular physical control mechanisms 405 in FIG. 4) to adjust the current speed and direction of movement of the SDV (see block 612), thereby preventing the SDV from striking the first animal at the position that the SDV is approaching on the roadway.

The flow-chart ends at terminator block 614.

In one embodiment of the present invention, movement of the animal 206 is predicted based on the animal 206 matching features of a cohort of animals who have occupied the position 208 on the roadway 204 (e.g., have crossed the roadway 204 at the spot depicted as position 208). Based on this historical data about other similar animals, an assumption is made that the current animal 206 will likewise enter the roadway 204 at position 208 in a similar manner as that of the members of the cohort. For example, assume that animals who have a similar trait (e.g., gait, direction of movement, etc.) as animal 206 have crossed roadway 212 shown in FIG. 2 90% of the time, and have crossed roadway 204 10% of the time when approaching the intersection of roadway 204 and roadway 212. Since animal 206 has the same traits as these similar animals (i.e., within a predefined cohort of animals), a prediction is made that animal 206 will also (or at least is likely to) cross roadway 212 rather than roadway 204, as well as when the animal will pass over the particular position 208.

Thus, in one embodiment of the present invention one or more processors (e.g., within roadway monitoring computer 201 and/or SDV on-board computer 401 and/or coordinating server 501 depicted above) retrieve animal profile information about the animal (e.g., animal 206), and then assign the animal to a cohort of animals who have occupied the position on the roadway (e.g., crossed the roadway at a particular spot) that is being approached by the SDV. As described above, the animal shares more than a predetermined quantity of traits with members of the cohort of animals. One or more processors then retrieve historical data (e.g., stored within computer 101 shown in FIG. 1) that describes movement by members of the cohort of animals when approaching the position on the roadway that is being approached by the SDV. The processor(s) then predict when the animal will reach the position on the roadway that is being approached by the SDV based on the historical data describing movement by members of the cohort of animals when approaching the position on the roadway that is being approached by the SDV. The SDV control processor on the SDV then adjusts the current speed and direction of movement of the SDV according to the historical data describing movement by members of the cohort of animals when approaching the position on the roadway that is being approached by the SDV, in order to avoid hitting the animal.

In an embodiment of the present invention and as described above, the SDV is selectively placed in "normal autonomous mode" or "caution autonomous mode" based on current roadway conditions. Thus, one or more processors receive roadway sensor readings from multiple roadway sensors (e.g., roadway sensors 253 shown in FIG. 2), where each of the multiple roadway sensors detects a different type of current condition of the roadway. The processor(s) assign a weight to each of the roadway sensor readings for different current conditions of the roadway (e.g., weighting wet conditions over dark conditions). The processor(s) then sum the weighted roadway sensor readings for the different current conditions of the roadway, and determine whether or not the summed weighted roadway sensor readings exceed a predefined level (e.g., a numeric value of weighted sensor readings). In response to the processor(s) determining that the summed roadway weighted sensor readings exceed the predefined level, the SDV control processor on the SDV adjusts the current speed and direction of movement of the SDV in order to avoid striking the animal at the position on the roadway that is being approached by the SDV.

In an embodiment of the present invention, autonomous control of the SDV is adjusted on the condition of mechanical systems on the SDV. For example, if the braking system of the SDV is in poor condition (e.g., the brake pads are worn down, such that it takes the SDV longer to stop than if the SDV had new brake pads), then the autonomous mode may be moved from the "normal autonomous mode" described herein to the "caution autonomous mode", thus allowing more distance for stopping the SDV (e.g., applying the brakes sooner, slowing the SDV down, etc.).

Thus, in one embodiment of the present invention, one or more processors (e.g., within the SDV) receive operational readings from one or more operational sensors (e.g., mechanical sensors 407 shown in FIG. 4) on the SDV, where the operational sensors detect a current state of equipment on the SDV. The processor(s), based on received operational readings, detect a fault (e.g., a mechanical fault such as faulty brakes, loose steering linkage, etc.) with the equipment on the SDV. In response to detecting the fault with the equipment on the SDV, the SDV control processor on the SDV adjusts the current speed and direction of movement of the SDV in order to avoid striking the animal at the position on the roadway that is being approached by the SDV.

Similarly, in one embodiment of the present invention, the SDV on-board computer on the SDV receives a first set of sensor readings (e.g., from roadway sensors 253 shown in FIG. 2) describing a physical condition of the roadway and a second set of sensor readings (e.g., from mechanical sensors 407 shown in FIG. 4) describing a mechanical condition of the SDV. The SDV on-board computer on the SDV then selectively shifts the SDV from a "normal" autonomous mode to a "caution" autonomous mode, such that the "caution" autonomous mode directs the SDV to travel slower than when in the "normal" autonomous mode.

In one embodiment of the present invention, the animal may be exhibiting movement (e.g., an excited appearance/movement) that is unpredictable. The on-board computer 401 can thus perform a video analysis of images from camera 404, make an assumption that the animal's movement will be irregular/excited and thus hard to predict, and further adjust the control of the SDV 202 (e.g., by providing additional time/space cushion around the animal 206 in order to compensate for any unexpected movement into the roadway 204 by the animal 206).

In another example, the animal may be accompanied by a human handler (e.g., the animal is a dog on a leash being held by a human being). If so, then a likelihood of the animal entering the roadway decreases, and control of the SDV 202 is handled accordingly.

In order to identify an accompanying entity, several embodiments are provided. For example, the presence of the human accompaniment to the animal may be detected by a camera (e.g., camera 404 depicted in FIG. 4) on the SDV 202 through the use of image recognition software. In a preferred embodiment, however, the presence of the accompanying entity is identified by an electronic signal being emanated from the accompanying entity. For example, if the accompanying entity has a smart phone, then a short-range electronic signal (e.g., having a range of less than 100') coming from the smart phone is detected by the SDV on-board computer 401, thus providing an identification of the person who is carrying a smart phone.

In the example of the accompanying entity being another animal, a short range signal transmitter (e.g., a smart collar on a dog) provides the SDV on-board computer 401 with a signal indicating that the dog is being accompanied by another dog, and thus may be distracted by the other dog, etc.

Thus, in one embodiment of the present invention, the on-board computer on the SDV receives accompaniment signals regarding the animal. These accompaniment signals describe a physical entity that is accompanying the animal. One or more processors (e.g., within SDV on-board computer 401) retrieve historical data that describes other animals that have occupied the position in the roadway with a same type of physical entity as the physical entity that is accompanying the animal. For example, the processors retrieve data about other animals crossing the street at the same location as animal 206 shown in FIG. 2. The processor(s) then generate, based on the historical data that describes other animals that have occupied the position in the roadway with the same type of physical entity, a predicted speed and direction of movement of the animal toward the position on the roadway. The SDV control processor on the SDV then adjusts the current speed and direction of movement of the SDV based on the predicted speed and direction of movement of the animal toward the position on the roadway, in order to avoid striking the animal.

In one embodiment of the present invention, the SDV provides a person (e.g., handler 222 shown in FIG. 2) who is accompanying the animal with a visual indication of its adjusted speed/direction. For example, assume that mounted on the SDV 202 is an adjustable light (e.g., adjustable light 402 shown in FIG. 4). The SDV on-board computer 401 is able to selectively adjust the color, intensity, flashing frequency, etc. of the adjustable light. Thus, if the SDV on-board computer 401 has directed and controlled the SDV 202 to adjust its speed and/or direction enough to allow the animal and its human handler to cross the roadway 204, then a visually coded (e.g., going from red to green, going from rapid flashing to slow flashing, etc.) light is emitted from the adjustable light, letting the animal know that he/she has adequate time to cross the roadway 204.

In one embodiment of the present invention, multiple sensors on the animal are used to predict the movement of the animal. For example, assume that a first animal sensor on animal 206 (e.g., one of the sensors 353 within the smart collar 216 shown in FIG. 3) measures muscle activity of the animal 206 (e.g., generates an EMG signal), while a second animal sensor on animal 206 detects the animal 206 barking. Either sensor measurement alone may not be enough to accurately predict that the animal 206 is likely to jump into the pathway of SDV 202 on roadway 204. However, when the two sensor measurements occur together, then this is enough to predict such movement.

Thus, in one embodiment of the present invention, a primary animal predicted movement signal is based on sensor signals generated by a first animal sensor on the first animal, and a secondary animal predicted movement signal is based on sensor signals generated by a second animal sensor that is on the same first animal. The SDV on-board computer on the SDV receives the primary animal predicted movement signal and the secondary animal predicted movement signal, both of which are indicative of (i.e., are present during) the predicted movement of the first animal. Processor(s) compare the primary animal predicted movement signal to the secondary animal predicted second signal, and then further determine the probability of the physical encounter (E) between the SDV and the first animal based on a level of similarity of movement predictions described in the primary animal predicted movement signal and the secondary animal predicted movement signal. For example, if the EMG readings and the barking sensors both are indicative of the animal about to run, then the conclusion is drawn that the animal is likely to run into the roadway on which the SDV is driving.

In one embodiment of the present invention, if the presence of two animals (e.g., the dogs depicted as animal 206 and animal 210 in FIG. 2) are within close proximity, then the SDV will anticipate that one or both are likely to run into the roadway 204, particularly if one or both are not restrained on a leash. In this scenario, the SDV 202 will slow down and/or adjust its direction, in anticipation of one or both of the dogs entering the roadway.

Thus, in one embodiment of the present invention, the on-board computer on the SDV receives a second animal presence signal from a second animal signal transceiver worn by a second animal, as well as a first animal presence signal from a first animal signal transceiver worn by the first animal. The second animal presence signal describes a presence of the second animal within a predefined proximity of the first animal. The processor(s) retrieve (e.g., from a memory within the SDV on-board computer 401 shown in FIG. 4) historical data that describes two animals moving towards each other in the roadway when initially within the predefined proximity to one another. The processor(s) are then able to predict that the first animal and the second animal will approach each other at the position that the SDV is approaching on the roadway based on the historical data. Based on this prediction, the SDV control processor on the SDV further adjusts the current speed and direction of movement of the SDV, in order to avoid striking the first animal and/or second animal.

As described above, a leash detector 303 is able to detect the attachment of a leash to a smart collar being worn by a dog. If so, then the dog is less likely to run in front of the SDV. Thus, in one embodiment of the present invention the SDV on-board computer on the SDV receives a leash connection signal from the animal signal transceiver, indicating/describing a connection state between a collar worn by the first animal and a leash. The SDV control processor on the SDV then further adjusts the current speed and direction of movement of the SDV based on the leash connection signal. If there is no leash, then the SDV will give the dog wider space. If there is a leash being held by a handler (or if the dog is tied up), then the SDV can assume that the dog will not be able to run in front of the SDV, and will maintain its current speed/direction.

As described above and in one embodiment of the present invention, only a single SDV is controlled using information from the smart collar regarding the animal. However, in another embodiment, multiple SDVs receive information about this single animal or multiple animals, and then coordinate their movement with regard to both the multiple animals as well as the SDVs. That is, by spawning multiple threads, processes, etc. from information from smart collars on the multiple animals, the SDVs coordinate their movement such that 1) no animals are struck, 2) no SDVs strike one another, and 3) optimal laminar flow of the SDVs is achieved.

For example and returning now to FIG. 2, assume that animal predicted movement signal(s) are received from the smart collar worn by one or both of animal 206 and animal 210. These animal predicted movement signal(s) are used by SDV 202 and SDV 214 to coordinate their movement not only with respect to animal 206 and/or animal 210, but also between themselves. That is, SDV on-board computers 401 within each of the SDVs 202/214 receive the animal predicted movement signal(s), and then coordinate their movement such that they continue to move smoothly, without stopping and starting, braking for unexpected movement by the animals 206/210, etc.

In one embodiment of the present invention, the smart collar worn by the animal described (as described above) has a limited range (e.g., 100 feet). As such, only SDVs that are within this limited range will communicate with the smart collar on the animal.

Active learning may be employed so that the system as a whole learns from the experiences of many SDVs and drivers, in different geographies and among cohorts. Geographies may include cities, rural areas, and the like. Cohorts from which the SDVs/drivers have a history of experience include cohorts of animals with certain characteristics. The active learning may also be used to update the profile of the animal (e.g., a person's pet) by taking into account that an older pet is less energetic than when it was when younger. The learning may also affect the pet's profile by taking into account how the given animal reacts to particular locations (e.g., becoming very excited and chasing strangers when it is in a crowded location or one where there are other pets/animals, or whether it has a propensity to chase cars).

In one embodiment of the present invention, two cohorts are defined. A first cohort is for SDVs/drivers, which demonstrate a certain operational history when encountering animals of a type found in a second cohort. A current SDV/driver is matched to the first cohort (i.e., by having similar traits) and a current animal being encountered is matched to the second cohort (i.e., by having similar traits). Thus, the historical operational experience of SDVs/drivers from the first cohort, when encountering animals having traits found in members of the second cohort, is used to predict the action of the current animal being encountered by the current SDV/driver.

As indicated above, some of the features of the present invention are also applicable to preventing an SDV from hitting a human pedestrian, including persons walking unaided, joggers, bicyclists, etc. As such, the electronic components described in the smart collar can be integrated into canes used by blind persons, wheel chairs, walkers, child back packs, runners' shoes, bikes, tricycles, skate boards, etc. Thus, if the pedestrian's profile is electronically available to the SDV from such devices (e.g., the age of the person carrying the bag), then the SDV can make adjustments accordingly (e.g., provide less cushion for experienced persons and more cushion for younger inexperienced persons).

Thus, the speed and direction of the SDV may be further adjusted based on a person's state, which is estimated/predicted by information stored in blind canes, walkers, baby carts, wheel chair, strollers, etc., and the SDV's state is communicated to the person(s) (e.g., location, speed, heading, etc. of the SDV). The SDV then adjusts its movement accordingly, such that the pedestrian is not hit.

As with the scenario in which a dog is distracted by another dog, a person can also be distracted by the presence of another person, dog, vehicle, etc. As such, sensors and transmitters alert the SDV of the presence of such other entities, in order to allow the SDV to predict that the pedestrian/person is likely to be distracted, and thus more likely to step in front of the SDV. Similarly, the pedestrian's history of walking (or rolling a wheel chair) into streets, known speed, accident history, movement (fast or slow) history, etc. can be used to predict the likelihood of the pedestrian walking in front of the SDV.

In one embodiment of the present invention, the prediction of the state of a person or animal used to generate a control signal for the SDV is computed using a Kalman filter, also known as a Linear Quadratic Estimation (LQE). The Kalman filter uses subsequent readings from sensors describing the movement of the animal/pedestrian and the movement of the SDV to more accurately predict the movement of the animal/pedestrian and the needed movement of the SDV to avoid hitting the animal pedestrian. In order to predict the movement of the animal/pedestrian, the Kalman filter first predicts/estimates the movement of the animal/pedestrian. As new information becomes available (e.g., from the sensors on the animal/pedestrian), the prediction is updated and refined for immediate use as well as future use for other animals/pedestrians. Similarly, the movement of the SDV when negotiating around the animal/pedestrian is updated according to the updated movement of the animal/pedestrian. This refined movement of the SDV is used to control the current SDV, as well as to provide a predicted movement route for future SDVs in similar scenarios, thereby improving the laminar (uninterrupted) flow of SDVs along the roadway.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
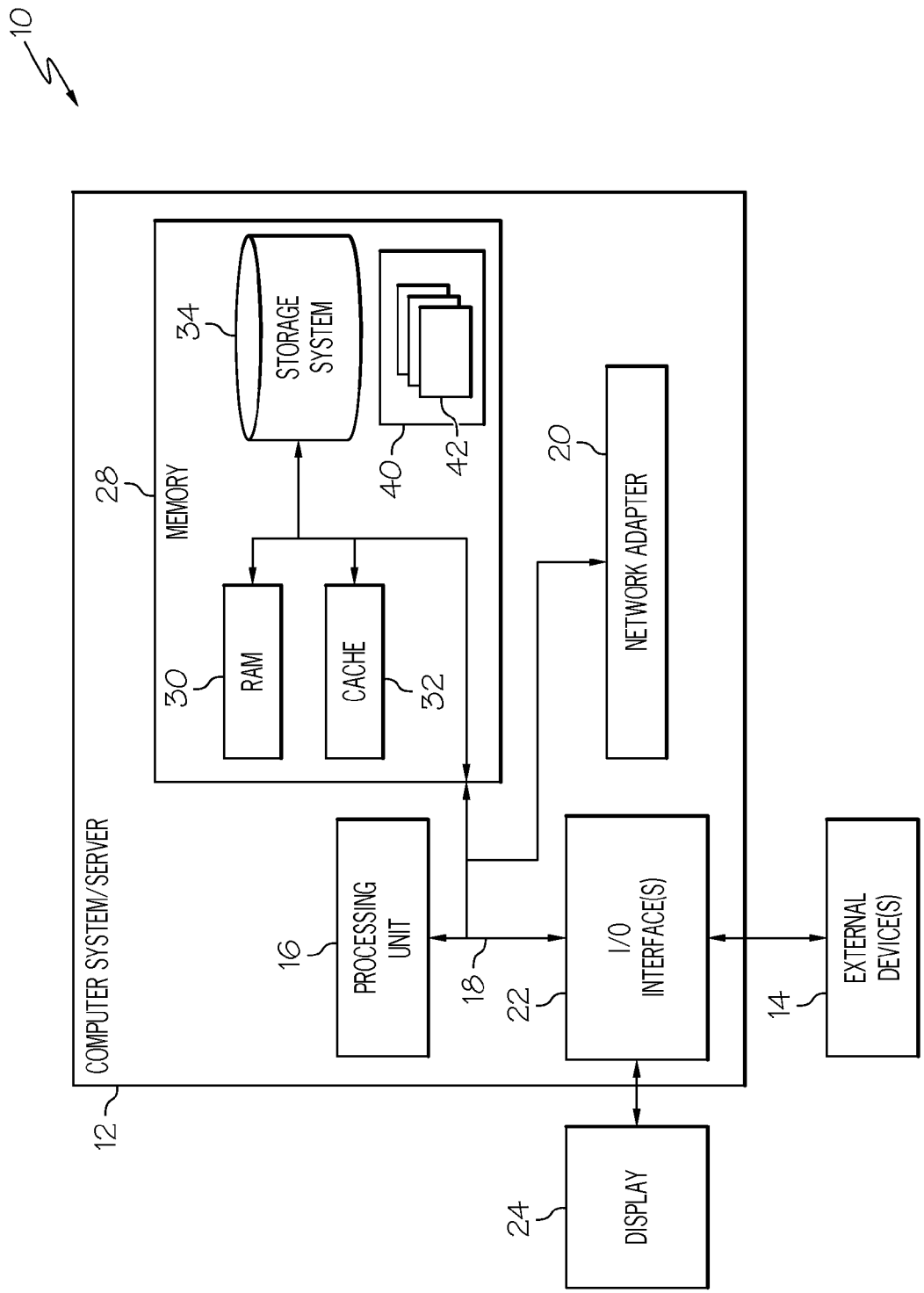
FIG. 7 depicts a cloud computing node according to an embodiment of the present disclosure.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
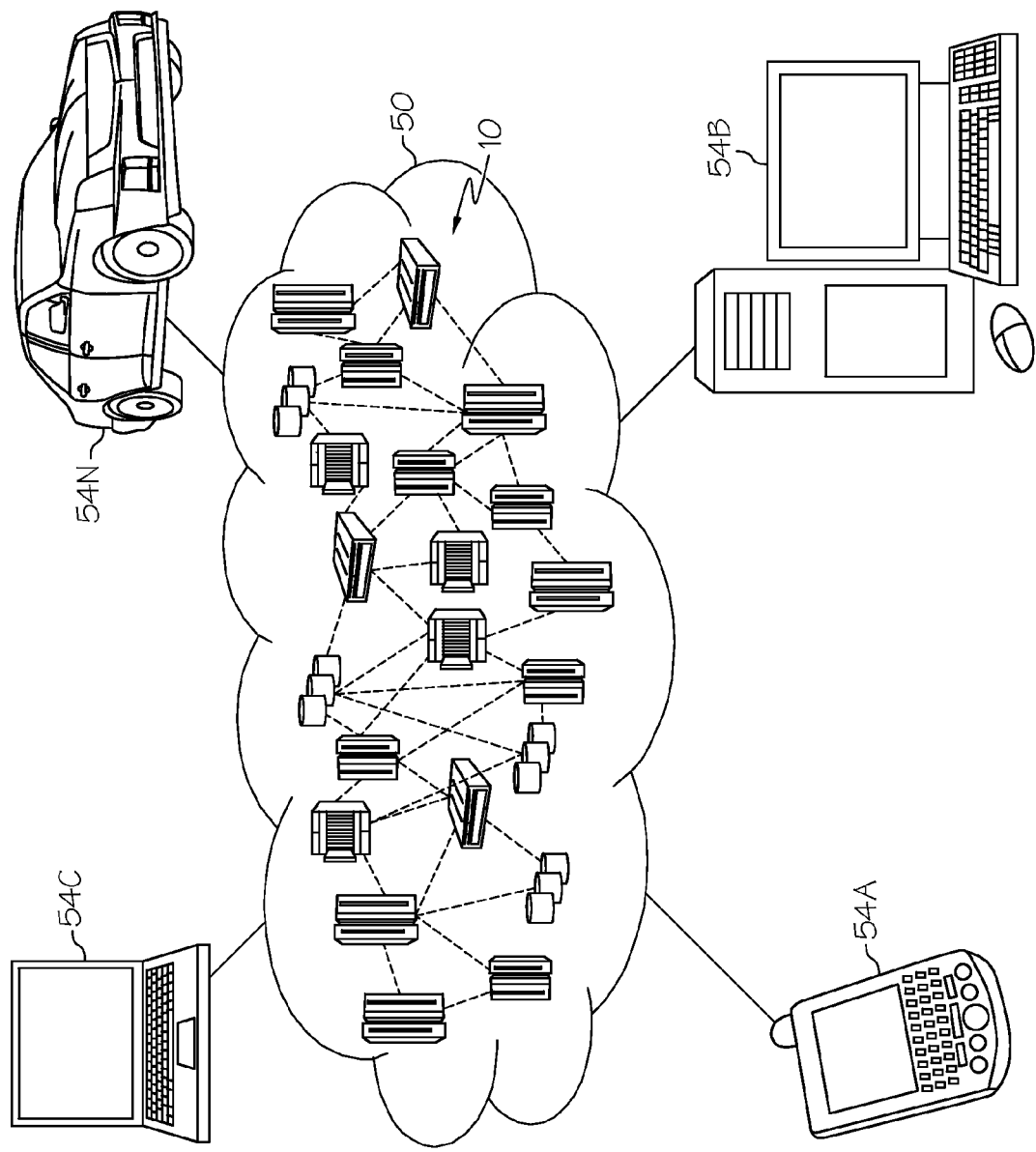
FIG. 8 depicts a cloud computing environment according to an embodiment of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 8 are intended to be illustrative only and that computing nodes 10 and cloud computing environment 50 can communicate with any type of computerized device over any type of network and/or network addressable connection (e.g., using a web browser).

Figure 9:
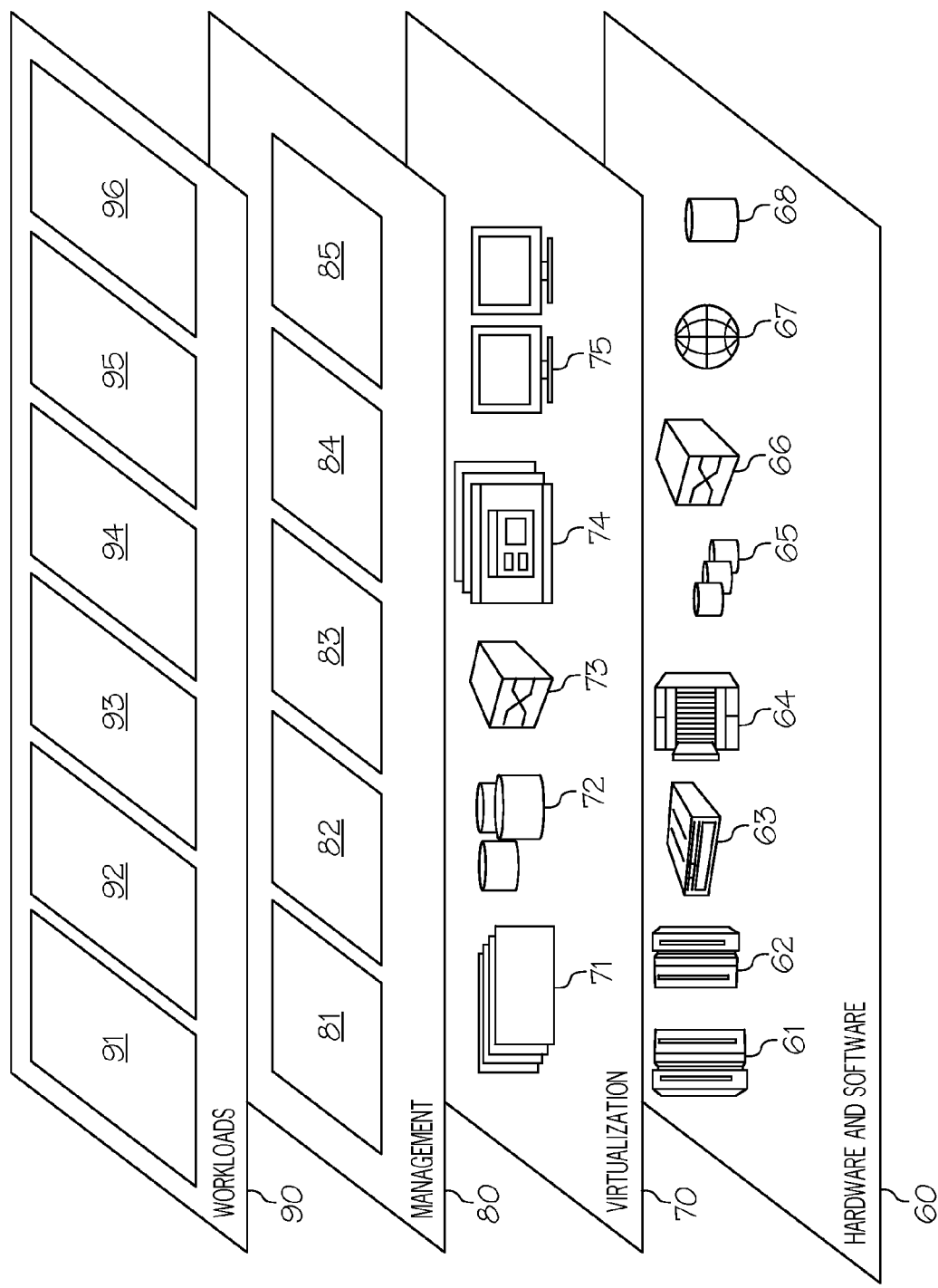
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for controlling a physical encounter between an SDV and an animal as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for causing a self-driving vehicle (SDV) to avoid a physical encounter with an animal, the computer-implemented method comprising:

receiving, by an SDV on-board computer on the SDV, a primary animal predicted movement signal from a first animal signal transceiver worn by a first animal, wherein the primary animal predicted movement signal is indicative of a predicted movement of the first animal towards a position that the SDV is approaching on a roadway;

receiving, by the SDV on-board computer, an SDV movement signal from a set of SDV sensors on the SDV that track movement of the SDV, wherein the SDV movement signal describes a current speed and direction of movement of the SDV on the roadway;

determining, by one or more processors, a probability of a physical encounter (E) between the SDV and the first animal exceeding a predefined confidence value (C) based on the primary animal predicted movement signal and the SDV movement signal;

in response to determining, by the SDV on-board computer and based on the SDV movement signal and the primary animal predicted movement signal, that E is greater than C, the SDV on-board computer instructing an SDV control processor on the SDV to direct SDV vehicular physical control mechanisms on the SDV to adjust the current speed and direction of movement of the SDV, thereby reducing a likelihood of the SDV striking the first animal at the position that the SDV is approaching on the roadway;

receiving, by the SDV on-board computer on the SDV, a second animal presence signal from a second animal signal transceiver worn by a second animal, wherein the second animal presence signal describes a presence of the second animal within a predefined proximity of the first animal;

retrieving, by the one or more processors, historical data that describes two animals moving towards each other in the roadway within the predefined proximity to one another;

predicting, by the one or more processors, that the first animal and the second animal will approach each other at the position that the SDV is approaching on the roadway based on the historical data; and further adjusting, by the SDV control processor on the SDV, the current speed and direction of movement of the SDV based on a prediction that the first animal and the second animal will approach each other at the position that the SDV is approaching on the roadway, in order to avoid striking the first animal.

2. The computer-implemented method of claim 1, further comprising:

retrieving, by the one or more processors, first animal profile information about the first animal;

assigning, by the one or more processors, the first animal to a cohort of first animals that have crossed the position on the roadway that the SDV is approaching, wherein the first animal shares more than a predetermined quantity of traits with members of the cohort of first animals;

retrieving, by the one or more processors, historical data describing movement by the members of the cohort of first animals when approaching the position on the roadway that the SDV is approaching;

predicting, by the one or more processors, when the first animal will reach the position on the roadway that the SDV is approaching based on the historical data describing the movement by the members of the cohort of first animals when crossing the position on the roadway that the SDV is approaching; and further adjusting, by the SDV control processor on the SDV, the current speed and direction of movement of the SDV according to the historical data describing the movement by the members of the cohort of first animals when crossing the position on the roadway that the SDV is approaching.

3. The processor-implemented method of claim 1, further comprising:

receiving, by the one or more processors, roadway sensor readings from multiple roadway sensors, wherein each of the multiple roadway sensors detects different current conditions of the roadway;

weighting, by the one or more processors, each of the roadway sensor readings for the different current conditions of the roadway;

summing, by the one or more processors, weighted roadway sensor readings for the different current conditions of the roadway;

determining, by the one or more processors, whether the summed weighted roadway sensor readings exceed a predefined level; and in response to determining that the summed roadway weighted sensor readings exceed the predefined level, further adjusting, by the SDV control processor on the SDV, the current speed and direction of movement of the SDV in order to avoid the SDV striking the first animal at the position on the roadway that the SDV is approaching.

4. The processor-implemented method of claim 1, further comprising:

receiving, by the one or more processors, operational readings from one or more operational sensors on the SDV, wherein the one or more operational sensors detect a current state of equipment on the SDV;

detecting, by the one or more processors and based on the received operational readings, a fault with the equipment on the SDV; and in response to detecting the fault with the equipment on the SDV, further adjusting, by the SDV control processor on the SDV, the current speed and direction of movement of the SDV in order to avoid the SDV striking the first animal at the position on the roadway that the SDV is approaching.

5. The processor-implemented method of claim 1, wherein the primary animal predicted movement signal is based on sensor signals generated by a first animal sensor on the first animal, and wherein the processor-implemented method further comprises:

receiving, by the SDV on-board computer on the SDV, a secondary animal predicted movement signal that is indicative of the predicted movement of the first animal, wherein the secondary animal predicted movement signal is based on sensor signals generated by a second animal sensor on the first animal;

comparing, by the one or more processors, the primary animal predicted movement signal to the secondary animal predicted second signal; and further determining, by the one or more processors, the probability of the physical encounter (E) between the SDV and the first animal based on a level of similarity of movement predictions described in the primary animal predicted movement signal and the secondary animal predicted movement signal.

6. The processor-implemented method of claim 1, further comprising:

receiving, by the SDV on-board computer on the SDV, a leash connection signal from the first animal signal transceiver, wherein the leash connection signal describes a connection state between a collar worn by the first animal and a leash; and further adjusting, by the SDV control processor on the SDV, the current speed and direction of movement of the SDV based on the leash connection signal.

7. The computer-implemented method of claim 1, further comprising:

receiving, by the SDV on-board computer on the SDV, a first set of sensor readings describing a physical condition of the roadway and a second set of sensor readings describing a mechanical condition of the SDV; and selectively shifting, by the SDV on-board computer on the SDV, the SDV from a normal autonomous mode to a caution autonomous mode, wherein the caution autonomous mode directs the SDV to travel slower than when in the normal autonomous mode.

8. A computer program product for causing a self-driving vehicle (SDV) to avoid a physical encounter with an animal, the computer program product comprising a non-transitory computer readable storage medium having program code embodied therewith, the program code readable and executable by a processor to perform a method, the method comprising:

receiving a primary animal predicted movement signal from a first animal signal transceiver worn by a first animal, wherein the primary animal predicted movement signal is indicative of a predicted movement of the first animal towards a position that the SDV is approaching on a roadway;

receiving an SDV movement signal from a set of SDV sensors on the SDV that track movement of the SDV, wherein the SDV movement signal describes a current speed and direction of movement of the SDV on the roadway;

determining a probability of a physical encounter (E) between the SDV and the first animal exceeding a predefined confidence value (C) based on the primary animal predicted movement signal and the SDV movement signal;

in response to determining, based on the SDV movement signal and the primary animal predicted movement signal, that E is greater than C, instructing an SDV control processor on the SDV to direct SDV vehicular physical control mechanisms on the SDV to adjust the current speed and direction of movement of the SDV, thereby reducing a likelihood of the SDV striking the first animal at the position that the SDV is approaching on the roadway;

receiving a leash connection signal from the first animal signal transceiver, wherein the leash connection signal describes a connection state between a collar worn by the first animal and a leash; and directing the SDV control processor on the SDV to further adjust the current speed and direction of movement of the SDV based on the leash connection signal.

9. The computer program product of claim 8, wherein the method further comprises:

retrieving first animal profile information about the first animal;

assigning the first animal to a cohort of first animals that have crossed the position on the roadway that the SDV is approaching, wherein the first animal shares more than a predetermined quantity of traits with members of the cohort of first animals;

retrieving historical data describing movement by members of the cohort of first animals when approaching the position on the roadway that the SDV is approaching;

predicting when the first animal will reach the position on the roadway that the SDV is approaching based on the historical data describing the movement by the members of the cohort of first animals when crossing the position on the roadway that the SDV is approaching; and directing the SDV control processor on the SDV to further adjust the current speed and direction of movement of the SDV according to the historical data describing movement by the members of the cohort of first animals when crossing the position on the roadway that the SDV is approaching.

10. The computer program product of claim 8, wherein the method further comprises:

receiving roadway sensor readings from multiple roadway sensors, wherein each of the multiple roadway sensors detects different current conditions of the roadway;

weighting each of the roadway sensor readings for the different current conditions of the roadway;

summing weighted roadway sensor readings for the different current conditions of the roadway;

determining whether the summed weighted roadway sensor readings exceed a predefined level; and in response to determining that the summed roadway weighted sensor readings exceed the predefined level, directing the SDV control processor on the SDV to further adjust the current speed and direction of movement of the SDV in order to avoid the SDV striking the first animal at the position on the roadway that the SDV is approaching.

11. The computer program product of claim 8, wherein the method further comprises:

receiving operational readings from one or more operational sensors on the SDV, wherein the one or more operational sensors detect a current state of equipment on the SDV;

detecting, based on the received operational readings, a fault with the equipment on the SDV; and in response to detecting the fault with the equipment on the SDV, directing the SDV control processor on the SDV to further adjust the current speed and direction of movement of the SDV in order to avoid the SDV striking the first animal at the position on the roadway that the SDV is approaching.

12. The computer program product of claim 8, wherein the primary animal predicted movement signal is based on sensor signals generated by a first animal sensor on the first animal, and wherein the processor-implemented method further comprises, and wherein the method further comprises:

receiving a secondary animal predicted movement signal describing the predicted movement of the first animal, wherein the secondary animal predicted movement signal is based on sensor signals generated by a second animal sensor on the first animal;

comparing the primary animal predicted movement signal to the secondary animal predicted second signal; and further determining the probability of the physical encounter (E) between the SDV and the first animal based on a level of similarity of movement predictions described in the primary animal predicted movement signal and the secondary animal predicted movement signal.

13. A computer system for causing a self-driving vehicle (SDV) to avoid a physical encounter with an animal, comprising:

one or more processors;

one or more computer readable memories; and one or more non-transitory computer readable storage mediums, and wherein program instructions are stored on at least one of the one or more non-transitory storage mediums for execution by at least one of the one or more processors via at least one of the one or more memories, to perform a method, the method comprising:

receiving a primary animal predicted movement signal from a first animal signal transceiver worn by a first animal, wherein the primary animal predicted movement signal is indicative of a predicted movement of the first animal towards a position that the SDV is approaching on a roadway;

receiving an SDV movement signal from a set of SDV sensors on the SDV that track movement of the SDV, wherein the SDV movement signal describes a current speed and direction of movement of the SDV on the roadway;

determining a probability of a physical encounter (E) between the SDV and the first animal exceeding a predefined confidence value (C) based on the primary animal predicted movement signal and the SDV movement signal;

in response to determining based on the SDV movement signal and the primary animal predicted movement signal that E is greater than C, instructing an SDV control processor on the SDV to direct SDV vehicular physical control mechanisms on the SDV to adjust the current speed and direction of movement of the SDV, thereby reducing a likelihood of the SDV striking the first animal at the position that the SDV is approaching on the roadway;

retrieving first animal profile information about the first animal;

assigning the first animal to a cohort of first animals that have crossed the position on the roadway that the SDV is approaching, wherein the first animal shares more than a predetermined quantity of traits with members of the cohort of first animals;

retrieving historical data describing movement by members of the cohort of first animals when approaching the position on the roadway that the SDV is approaching;

predicting when the first animal will reach the position on the roadway that the SDV is approaching based on the historical data describing the movement by the members of the cohort of first animals when crossing the position on the roadway that the SDV is approaching; and directing the SDV control processor on the SDV to further adjust the current speed and direction of movement of the SDV according to the historical data describing the movement by the members of the cohort of animals when crossing the position on the roadway that the SDV is approaching.

14. The computer system of claim 13, wherein the method further comprises:

receiving roadway sensor readings from multiple roadway sensors, wherein each of the multiple roadway sensors detects different current conditions of the roadway;

weighting each of the roadway sensor readings for the different current conditions of the roadway;

summing weighted roadway sensor readings for the different current conditions of the roadway;

determining whether the summed weighted roadway sensor readings exceed a predefined level; and in response to determining that the summed roadway weighted sensor readings exceed the predefined level, directing the SDV control processor on the SDV to further adjust the current speed and direction of movement of the SDV in order to avoid striking the first animal at the position on the roadway that is being approached by the SDV.

15. The computer system of claim 13, wherein the method further comprises:

receiving operational readings from one or more operational sensors on the SDV, wherein the one or more operational sensors detect a current state of equipment on the SDV;

detecting, based on received operational readings, a fault with the equipment on the SDV; and in response to detecting the fault with the equipment on the SDV, directing the SDV control processor on the SDV to further adjust the current speed and direction of movement of the SDV in order to avoid striking the first animal at the position on the roadway that is being approached by the SDV.

16. The computer system of claim 13, wherein the method further comprises:

receiving a second animal presence signal from a second animal signal transceiver worn by a second animal, wherein the second animal presence signal describes a presence of the second animal within a predefined proximity of the first animal;

retrieving historical data that describes two animals moving towards each other in the roadway within the predefined proximity to one another;

predicting that the first animal and the second animal will approach each other at the position that the SDV is approaching on the roadway based on the historical data; and further adjusting the current speed and direction of movement of the SDV based on a prediction that the first animal and the second animal will approach each other at the position that the SDV is approaching on the roadway, in order to avoid striking the first animal.

17. The computer system of claim 13, wherein the method further comprises:

receiving a leash connection signal from the first animal signal transceiver, wherein the leash connection signal describes a connection state between a collar worn by the first animal and a leash; and further directing the SDV control processor on the SDV to adjust the current speed and direction of movement of the SDV based on the leash connection signal.

* * * * *